US008099412B2

(12) United States Patent
Yan et al.

(10) Patent No.: US 8,099,412 B2
(45) Date of Patent: Jan. 17, 2012

(54) QUERY STATISTICS PROVIDER (75) Inventors: Weipeng Yan, Redwood City, CA (US);
Nicholas C. Fox, Foster City, CA (US);
Roberto J. Bayardo, Morgan Hill, CA (US); David Chen Chang, Mountain View, CA (US); Monica D. Chawathe, Los Altos, CA (US)

(73) Assignee: Google Inc., Mountain View, CA (US)

( * ) Notice: Subject to any disclaimer, the term of this patent is extended or adjusted under 35 U.S.C. 154(b) by 207 days.

(21) Appl. No.: 12/124,487

(22) Filed: May 21, 2008

(65) Prior Publication Data

US 2008/0294630 A1    Nov. 27, 2008

Related U.S. Application Data (60) Provisional application No. 60/939,345, filed on May 21, 2007.

(51) Int. Cl.
*G06F 17/30*    (2006.01)

(52) U.S. Cl. .................... 707/721; 705/14.54
(58) Field of Classification Search .............. None
See application file for complete search history.

(56) References Cited

U.S. PATENT DOCUMENTS

| | | | |
|---|---|---|---|
| 5,640,553 A | 6/1997 | Schultz | |
| 6,438,537 B1 | 8/2002 | Netz et al. | |
| 6,519,585 B1* | 2/2003 | Kohli | 707/3 |
| 6,701,309 B1* | 3/2004 | Beeferman et al. | 1/1 |
| 6,938,035 B2 | 8/2005 | Driesch et al. | |
| 7,975,150 B1* | 7/2011 | Lillibridge et al. | 713/193 |
| 2003/0187739 A1* | 10/2003 | Powers | 705/14 |
| 2003/0208594 A1* | 11/2003 | Muret et al. | 709/224 |
| 2004/0221235 A1* | 11/2004 | Marchisio et al. | 715/534 |
| 2004/0244029 A1* | 12/2004 | Gross | 725/9 |
| 2004/0254920 A1* | 12/2004 | Brill et al. | 707/3 |
| 2004/0260621 A1* | 12/2004 | Foster et al. | 705/26 |
| 2005/0222901 A1 | 10/2005 | Agarwal et al. | |
| 2006/0064411 A1* | 3/2006 | Gross et al. | 707/3 |
| 2006/0123001 A1* | 6/2006 | Burns | 707/6 |
| 2006/0149625 A1* | 7/2006 | Koningstein | 705/14 |
| 2006/0173744 A1* | 8/2006 | Kandasamy et al. | 705/14 |
| 2006/0195428 A1* | 8/2006 | Peckover | 707/3 |
| 2007/0143176 A1* | 6/2007 | Nong et al. | 705/14 |
| 2007/0162379 A1* | 7/2007 | Skinner | 705/37 |

(Continued)

OTHER PUBLICATIONS

"User 4XXXXX9: Anonymizing Query Logs," by Adar, Eytan. IN: Query Log Analysis Workshop, WWW 2007 (May 8-12, 2007). Available at: http://www2007.org/workshop-W6.php (at least as early as Last modified date of Apr. 4, 2007). Last visited: Feb. 19, 2011.*

(Continued)

*Primary Examiner* — Neveen Abel Jalil
*Assistant Examiner* — Daniel Kinsaul
(74) *Attorney, Agent, or Firm* — Fish & Richardson P.C.

(57) ABSTRACT

A system to provide search query information. The system receives a request for search query information, identifies a set of search queries from a search query log that includes search queries submitted to a search service over a predetermined length of time, and provides the set of search queries. Each of the set of search queries is associated with at least a predetermined number of unique identifiers. Each of the set of search queries is matched to the request for search query information by a combination of exact matches, expanded matches, and broad matches.

27 Claims, 6 Drawing Sheets

U.S. PATENT DOCUMENTS

| | | | |
|---|---|---|---|
| 2008/0034083 A1* | 2/2008 | Koran | 709/224 |
| 2008/0104021 A1* | 5/2008 | Cai et al. | 707/3 |
| 2008/0133503 A1* | 6/2008 | Popescul et al. | 707/5 |
| 2009/0112805 A1* | 4/2009 | Garbow et al. | 707/3 |
| 2011/0040733 A1* | 2/2011 | Sercinoglu et al. | 707/688 |

OTHER PUBLICATIONS

"On Anonymizing Query Logs via Token-based Hashing," by Kumar et al. IN: WWW2007 (May 8-12, 2007). Available at: ACM.*

"Protecting User Privacy in Private Information Retrieval Schemes," by Gertner et al. IN: STOC '98 (1998). Available at: ACM.*

"Privacy-Preserving Data Mining Systems," by Zhang and Zhao. IN: IEEE Computer Society, vol. 40, issue 4, pp. 52-58 (Apr. 2007). Available at: IEEE.*

PCT International Search Report and Written Opinion for International Application No. PCT/US2008/064367, dated May 21, 2008.

* cited by examiner

FIG. 1

Create a report: To begin a new report on your account activity, choose from the available options below, then click *Create Report*..

1. Report Type:
   Choose a report type from the following options:

☐ Keyword Performance
   ☑ Search Query Performance     } 202
   ☐ Ad Performance 2. Settings:
   You can add or remove columns by changing the selections below:

☑ Campaign           ☑ Number of Impressions
   ☑ Ad keyword         ☑ Number of Clicks
   ☑ Search query       ☑ Number of Conversions    } 204
   ☐ Daily Budget       ☐ Click Through Rate
   ☑ Match Type         ☐ Cost Per Click

206
   • • •

3. Scheduling and E-mail:

Scheduling: Schedule this report to run automatically _______

Email: Whenever this report runs, send email to: _______

208
   [ Create Report ]

QUERY STATISTICS PROVIDER

RELATED APPLICATIONS

This application claims priority to U.S. provisional application No. 60/939,345, filed on May 21, 2007, the contents of which are incorporated herein by reference.

TECHNICAL FIELD

This document generally relates to information management.

BACKGROUND

The selection of advertisements for presentation (e.g., display), such as with search results and other information, and the ordering of those advertisements, may be achieved by various techniques. In one exemplary technique, an initial determination is made to identify all advertisements that are a match or near match for applied search terms or other query items or information. The match may be made, for example, between one or more words in a query, and keywords identified by an advertiser and associated with a particular advertisement or group of advertisements, such as a campaign.

For example, a company selling fishing tackle may have a line of large lures, and may thus identify terms such as "lunker," "sturgeon," and "muskie fever" as keywords to associate with their advertisements for such large lures. Those advertisements may then be considered by the system for display when search results are displayed to a user who enters such terms. The comparison may also be made between a search or query, and the text in an advertisement or the text in a target of a hyperlink in an advertisement, or to a combination of keywords, target text, and advertisement text, among other possible techniques. For example, the system may effectively select terms from an advertisement as keywords so that the advertisement is selected for possible display when a search or other user action associated with the keywords is submitted. An advertisement may be selected for possible display if there is a "near" match also, for example, if a query includes terms that are known synonyms or mistypings/misspellings of the key word terms; for an advertisement. The group of matching advertisements may be termed a candidate group.

In some systems, when a user clicks on or otherwise selects the advertisement, a landing web page of the advertiser is displayed to the user. At the advertiser's web site, the user may make a purchase, download a document or file, or take some other measurable action. A number of metrics can be used to measure a performance of an advertisement campaign. For example, a click-through-rate is obtained by dividing the number of users who clicked on an advertisement on a web page by the number of times the advertisement was delivered or rendered for viewing to a user (i.e., impressions). A conversion rate is the percentage of unique visitors who take a desired action (e.g., upon visiting the website). The desired action can be, for example, filling out a form, visiting a predetermined page, or completing a transaction or purchase. The performance metrics can be provided to advertisers to improve advertisement campaigns.

SUMMARY

In one aspect, in general, a computer-implemented method includes receiving a request for search query information, identifying a set of search queries from a search query log that includes search queries submitted to a search service over a predetermined length of time, in which each of the set of search queries is associated with at least a predetermined number of unique identifiers, and providing the set of search queries.

Implementations of the method may include one or more of the following features. Each identifier can be associated with a client device that submitted a search request containing the search query. The identifier can include a cookie identifier. Identifying the set of search queries can include identifying search queries that are associated with an advertisement. The method can include providing the set of search queries to a sponsor of the advertisement. The method can include categorizing the set of search queries into two or more categories based on a level of similarity between each of the search queries and a keyword associated with the advertisement. The method can include providing the two or more categories of search queries to the sponsor of the advertisement. The method can include identifying search queries that trigger the display of the advertisement. The method can include identifying search queries that are associated with clicking of the advertisement. The method can include normalizing the search queries. Normalizing the search queries can include identifying query terms in the search queries and preserving an ordering of the query terms.

In another aspect, in general, a computer-implemented method includes receiving a request for search query information, identifying one or more search queries that have low probability of including personal information of a user who submitted the search query, and providing the set of search queries. The identifying includes processing search queries submitted by users of a search service over a predetermined length of time to identify a set of search queries each being associated with at least a predetermined number of unique identifiers.

Implementations of the method may include one or more of the following features. Each unique identifier can be associated with a unique client device that submitted a search request containing the search query. Each unique identifier can include a unique cookie identifier. Identifying the search queries can include identifying search queries that are associated with an advertisement. The method can include providing the set of search queries to a sponsor of the advertisement. The method can include categorizing the set of search queries into two or more categories based on a level of similarity between each of the search queries and a keyword of key phrase associated with the advertisement.

In another aspect, in general, a computer-implemented method includes receiving from a sponsor of an advertisement a request for search query information, providing search queries that match the advertisement to the sponsor, the search queries being submitted by users of a search service; and reducing a probability that the search queries include personal information of the users. This includes providing to the sponsor search queries, that were submitted to the search service over a predetermined length of time, in which each of the search queries provided to the sponsor is associated with at least a predetermined number of unique identifiers.

Implementations of the method may include one or more of the following features. Each identifier can be associated with a client device that submitted a search request containing the search query. The identifier can include a cookie identifier.

In another aspect, in general, an apparatus, includes a query statistics engine to automatically identify a set of search queries that has a low probability of including personal data of users who submitted the search queries; and a data storage device to store the set of search queries. The query statistics engine identifies the set of search queries from a search query log that includes search-queries submitted to a search service over a predetermined length of time, and each of the set of search queries is associated with at least a predetermined number of unique identifiers.

Implementations of the apparatus may include one or more of the following features. The apparatus can include a search server to receive search requests containing search queries, and store the search queries in the data storage device. Each identifier can be associated with a client device that submitted a search request containing the search query. The identifier can include a cookie identifier. The query statistics engine can normalize the search queries. The query statistics engine can normalize the search queries by identifying query terms in the search queries and preserving an ordering of the query terms.

In another aspect, in general, an apparatus includes means for receiving a request for search query information, means for identifying a set of search queries from a search query log that includes search queries submitted to a search service over a predetermined length of time. Each of the set of search queries has been submitted by at least a predetermined number of unique users of the search service. The apparatus includes means, for providing the set of search queries.

In another aspect, in general, a computer-implemented method includes receiving a request for search query information based on at least one query keyword associated with an advertisement, identifying a set of search queries from a search query log associated with the at least one query keyword, the set of search queries including search queries submitted to a search service over a predetermined length of time, in which each of the set of search queries is associated with at least a predetermined number of unique identifiers, and associating the set of search queries with the advertisement and the at least one query keyword.

Implementations of the method may include one or more of the following features. The association between the search queries from the search query log and the at least one query keyword can include ah exact match, an expanded match, or a broad match. The association between the search queries from the search query log and the at least one query keyword can include a combination of at least two of exact matches, expanded matches or broad matches. The method can include categorizing the set of search queries into two or more categories based on a level of similarity between each of the search queries and the query keyword. The method can include providing the two or more categories of search queries to a sponsor of the advertisement. The identifier can include a cookie identifier. The method can include associating the advertisement with an advertising sponsor, and providing the set of search queries to the sponsor of the advertisement.

In another aspect, in general, a computer-implemented method includes receiving a request for search query information based on at least one query keyword associated with an advertisement, the advertisement being associated with an advertising sponsor, identifying one or more search queries that substantially exclude personal information of a user who submitted the search query, in which the identifying includes processing search queries submitted by users of a search service over a predetermined length of time to identify a set of search queries each being associated with at least a predetermined number of unique identifiers. The method includes associating the one or more search queries with the at least one query keyword, and providing the set of search queries associated with the at least one query keyword to the sponsor of the advertisement.

Implementations of the method may include one or more of the following features. The method can include categorizing the set of search queries into two or more categories based on a level of similarity between each of the search queries and the at least one query keyword associated with the advertisement. The categorization can include a matching method including at least one of an exact match, an expanded match, and a broad match.

In another aspect, in general, a computer-implemented method includes receiving from a sponsor of an advertisement a request for advertisement placement information, providing search queries that match the advertisement to the sponsor, the search queries being submitted by users of a search service, the search queries being provided when each search query has been submitted by a number of unique users above a predetermined popularity threshold. The method includes reducing a probability that the search queries include personal information of the users, including providing to the sponsor search queries that were submitted to the search service over a predetermined length of time; in which each of the search queries provided to the sponsor is associated with at least a predetermined number of unique identifiers.

Implementations of the method may include one or more of the following features. The method can include matching the search queries to the advertisement through at least one of exact matches, expanded matches, and broad matches.

In another aspect, in general, an apparatus includes a data storage device, a search server to receive search requests containing search queries and store the search queries in the data storage device, and an advertising server to receive advertisements from advertising sponsors for advertisement placement. The apparatus includes a query statistics engine to automatically identify a set of search queries from the search server that has a low probability of including personal data of users who submitted the search queries, in which the query statistics engine identifies the set of search queries from a search query log that includes search queries submitted to the search server over a predetermined length of time, and each of the set of search queries is associated with at least a predetermined minimum number of unique user identifiers. The apparatus includes a matching engine that matches the set of search queries to the advertisement from the advertising sponsor.

Implementations of the method may include one or more of the following features. The matching engine can include at least one of an exact match engine; an expanded match engine, and a broad match engine. Each identifier can be associated with a client device that submitted a search request containing the search query. The identifier can include a cookie identifier. The query statistics engine can normalize the search queries. The query statistics engine can normalize the search queries by identifying query terms in the search queries and preserving an ordering of the query terms.

Advantages of the apparatuses and methods may include one or more of the following. Advertisers can obtain more information about search queries related to their ads and use the information to improve their ad campaigns. The information is also useful in helping the advertisers evaluate whether the ads are reaching the target audience. More revenue can be generated by both the advertisers and the search services that match the ads with user search requests. Users can receive more relevant ads as a result of improved ad campaigns. The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
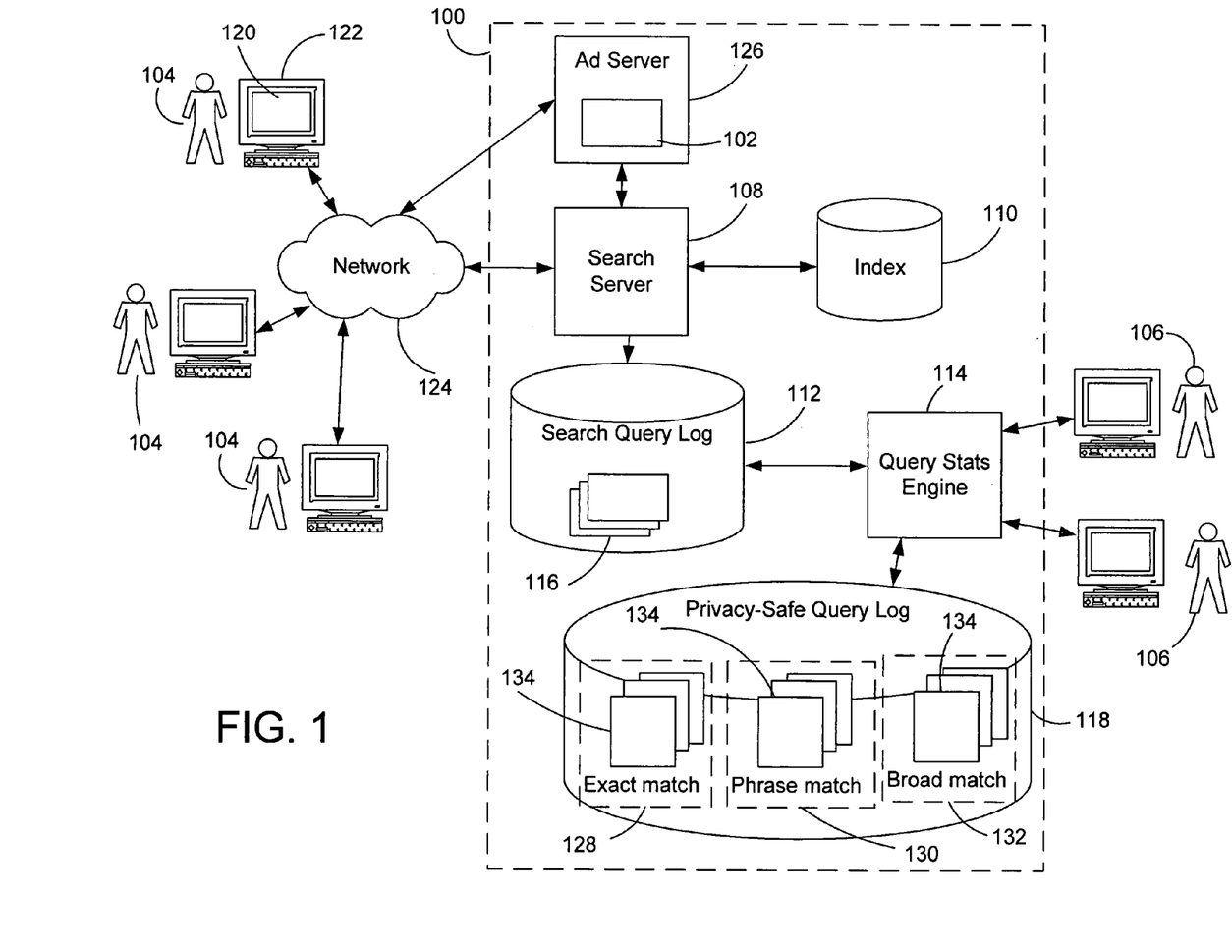
FIG. 1 is a diagram of an example information retrieval system.

FIG. 1 is a schematic diagram of an example information retrieval system 100 for retrieving and displaying information (e.g., web documents) and content (hereinafter referred to as advertisements or simply ads) that match search queries submitted by users 104. The system 100 shows search query information to advertisers 106 (sponsors of the ads) to provide transparency and to allow the advertisers 106 to improve the performance of ad campaigns. In some examples, the system 100 provides the advertisers 106 the raw query terms of the search queries received by the system 100 in which there is a very low probability (e.g.; close to zero) that the search queries include personal information (e.g., home address or social security numbers).

The system 100 may receive, e.g., millions of search queries a week, and finding which search queries do not include personal information manually can be laborious and time consuming. A feature of the system 100 is that it can automatically identify search queries that have very low probabilities (e.g., close to zero) of containing personal information. This technique is based on an insight that when different people submit search queries, it is unlikely that they will query the same specific personal information. For example, it is unlikely that dozens of people will submit search queries containing the exact same social security number. When the search queries are gathered over a period of time, not only is it unlikely that search queries each being submitted by multiple users will include personal information, it is also unlikely that those search queries can be traced to a specific user.

Another feature of the system 100 is that it can show a small percentage of the total search queries received by the system 100 to the advertisers 106, while covering a large percentage of the search queries relevant to the advertisers 106. Advertisers 106 are concerned about which search queries result in their ads being clicked on. A large percentage of the ads that, are clicked on are triggered by search queries that each have been submitted by multiple users 104. The users 104 who clicked on a particular ad are likely to have been shown the particular ad because they typed in the same search terms. For example, a large percentage of the clicks for an ad for a particular portable music player may come from users who have typed in the name of that particular music player and hence have the same or similar search queries. For example, the system 100 may show the advertiser 106 less than 1% of the total unique search queries received over a period of time and cover more than 50% of the search queries that triggered clicks on the ad.

The system 100 includes a search server 108 that enables the users 104 to search for information using, for example, a keyword search. In some examples, the user 104 may use a web browser 120 executing on a client machine 122 (e.g., personal computer) to access the search server 108 through a network 124 (e.g., Internet). The user 104 sends a search request that includes a search query to the search server 108. The search query may include one or more search terms (e.g., keywords or key phrases). In response, the search server 108 searches an index 110, returns a list of pages that match the search query submitted by the user 104, and provides the list of pages in a sequence according to rank scores of the pages. The search server 108 may also cause ads to be displayed alongside the list of returned pages. The ads may be provided by an ad server 126.

The system 100 includes a search query log 112 that stores the search queries submitted by the users 104 and information associated with the search queries. The information may include, e.g., a time stamp specifying when the search query was submitted, an IP address of the user submitting the search query, and a unique cookie identifier. The information about a search query may also indicate, for example, which ads were displayed and/or clicked when triggered by the search query.

The term "search request" refers to the request for information sent from the user 104 to the search server 108, and the term "search query" refers to the search terms and operators (e.g., Boolean operators) contained in the search request. Search requests from different users 104 may contain the same search query. As described below, different users 104 may be associated with different identifiers, such as cookie identifiers. Thus, a search query may be associated with multiple unique identifiers if multiple users 104 submit the same search query.

The system 100 includes a query statistics engine 114 that processes search queries 116 from the search query log 112 and provides information about the search queries 116 to the advertisers 106. The advertisers 106 may use the information about the search queries 116 to improve their ad campaign and to determine whether their ads are reaching the target audience.

In some implementations, the query statistics engine 114 provides a graphical user interface 200 (see FIG. 2) to allow the advertisers 106 to select what statistics to view. For example, the advertiser 106 may request to view the search queries that triggered particular actions, e.g., causing the ad to be displayed, clicked, or converted. In response, the query statistics engine 114 identifies search queries 116 that are associated with the particular ad and actions. The query statistics engine 114 may provide raw query terms (e.g., the actual keywords submitted by the users 104) of the search queries 116 to the advertiser 106. The query statistics engine 114 has a built-in safeguard to prevent showing search queries 116 with personal information.

The search queries 116 submitted by the users 104 may include personal information. For example, some users 104 may include their home addresses in search queries to search for local information. Some users 104 may enter their social security numbers in search queries 116 to see whether their social security numbers are listed in public documents. The users 104 may enter personal information in search queries for other reasons. To protect the privacy of the users 104, the query statistics engine 114 identifies search queries 116 that do not include personal information, referred to as "privacy-safe" queries 134, and stores those queries in a privacy-safe query log 118. The query statistics engine 114 provides only privacy-safe search queries 134 to the advertisers 106.

In some implementations, the query statistics engine 114 identifies privacy-safe queries 134 by identifying search queries 116 that have been submitted by at least a predetermined number of unique users, over a predetermined length of time. For example, if the same search query 116 is submitted by dozens of unique users 104 over a month or longer, it is unlikely that the dozens of unique users 104 are querying the same specific personal information. The requirement that the search queries 116 be submitted by at least a predetermined number of unique users can be seen as a popularity threshold, in which only search queries 116 that are popular among different users are deemed privacy-safe.

The predetermined number can be, e.g., more than 10, and the predetermined length of time can be, e.g., more than one month. The criteria (e.g., the number of unique users and the length of time) used by the query statistics engine 114 to identify privacy-safe search queries 134 can vary depending on, for example, the type of search service provided by the search server 108.

In some implementations, the query statistics engine 114 may perform query normalization to consolidate the search queries 116 when identifying privacy-safe search queries 134. Query normalization can be performed by breaking down the search query into search terms (or tokens) and preserve the sequence of the search terms. For example, two or more spaces between two keywords in the search query can be reduced to one white space. Special operators, negative terms; and certain connector symbols can be removed from the search queries.

For example, the search query "apple juice" (with two or more white spaces between "apple" and "juice") and the search query "apple juice" (with one white space between "apple" and "juice") can be determined to be the same search query. The search query "apple-orange juice" and "apple and juice" can also be determined to be the same search query as "apple juice". Thus, if the search queries "apple juice", "apple juice", "apple-orange, juice", and "apple and juice" are submitted by four different users, the query statistics engine 114 may consider the search query "apple juice" to be submitted by four unique users. This increases the possibility that a query (e.g., either "apple juice", "apple juice", "apple-orange juice", or "apple and juice") may be marked as a privacy-safe query while not violating privacy, as extra spaces and certain connection symbols do not disclose any personal information.

In some implementations, the query statistics engine 114 uses a proxy method to determine whether the search queries 116 are submitted by unique users 104 based on cookies associated with the users 104. When the user 104 uses the web browser 120 to access the search server 108, the search server 108 is configured to cause; the web browser 120 to store a cookie at the client device 122 when the user 104 first accesses the search server 108. Each cookie can include an identifier, but may not include personal information of the user 104. When the user 104 sends a search request to the search server 108, the cookie identifier can also be provided to the search server 108. The cookies stored in different client devices 122 may have different identifiers.

The query statistics engine 114 identifies normalized search queries 116 submitted by unique users 104 by finding search queries 138 associated with different cookie identifiers. Multiple users 104 may be using the same client device 122, so it is possible that search queries 116 submitted by different users are associated with the same cookie identifier. This does not typically affect the ability of the query statistics engine 114 to identify privacy-safe search queries 134, because when the query statistics engine 114 is configured to identify search queries 116 that are associated with at least n unique cookie identifiers, and each cookie identifier is associated with one or more unique users 104, then the privacy-safe search queries 134 may be associated with n or more unique users 104. Although a user 104 may use multiple client devices 122 to access the search server 108 and be associated with multiple cookie identifiers, the likelihood that the user 104 will use the multiple client devices 122 to submit the same search query that includes the same personal information is low and the frequency of such activity is low, such that the number of unique users per query would highly likely fall below the unique user threshold.

In some implementations, users 104 have the option of turning off cookies. When the user 104 turns off the cookies in the web browser 120, the search server 108 may still assign a cookie to the web browser 120, but the web browser 120 may not store the cookie. When the web browser 120 sends a search request to the search server 108, the search server 108 will receive the cookie, which includes a first time stamp of when the cookie was generated and a second time stamp of when the cookie was sent by the web browser 120. The search server 108 can determine whether the user 104 has turned off the cookie by, e.g., determining a freshness of the cookie based on a comparison of the first and second time stamps. If the difference between the two time stamps is less than, for example, 10 seconds, the cookie is considered to be fresh and the query statistics engine 114 determines that the cookie has been turned off by the user 104.

In some implementations, users 104 who have submitted the same search query with the cookies turned off may be lumped together and considered to be one unique user by the query statistics engine 114. Thus, if the threshold of unique users is p for determining whether a search query 116 is privacy-safe, then the search query 116 may be considered to be privacy-safe if there are at least p−1 unique users 104 who have submitted the search query 116 and have not turned off the cookie, and one or more users 104 who have submitted the search query 116 but have turned off the cookie.

The query statistics engine 114 may categorize the privacy-safe search queries 134 into different categories based on a similarity level of the search terms and the keywords associated with the ad. For example, the search queries 134 may be categorized into three categories: exact match category 128, phrase match category 130, and broad match category 132. The exact match category 128 includes search queries 134 in which the search terms are exactly the same as the ad keywords. The phrase match category 130, also referred to as an expanded match category, includes search queries 134 in which the ad keywords are part of (e.g., a sub-string of) the search terms. The broad match category 132 includes search queries 134 in which the search terms generally match the ad keywords, e.g., a portion of the ad keywords matches the search terms, the ad keywords appear in the search queries but in different order, or the ad keywords are synonyms of the search terms.

For example, if an ad is associated with the keywords "plasma hdtv", a search query 134 having search terms "plasma hdtv" may be placed in the exact-match category 128. A search query 134 having search terms "cheap plasma hdtv" may be placed in the phrase-match category 130 because the ad keywords are part of the search terms. Search queries 134 having search terms "hdtv plasma" or "LCD hdtv" may be placed in the broad-match category 132.

The system 100 may include a matching engine (not shown) that matches the set of search queries to the advertisement. The matching engine may include, for example, an exact match engine, an expanded match or phrase match engine, and a broad match engine.

The query statistics engine 114 and the matching engine may be implemented using, for example, dedicated hardware, software modules executing on a general purpose computer, or a combination of customized hardware and software.

Figure 2:
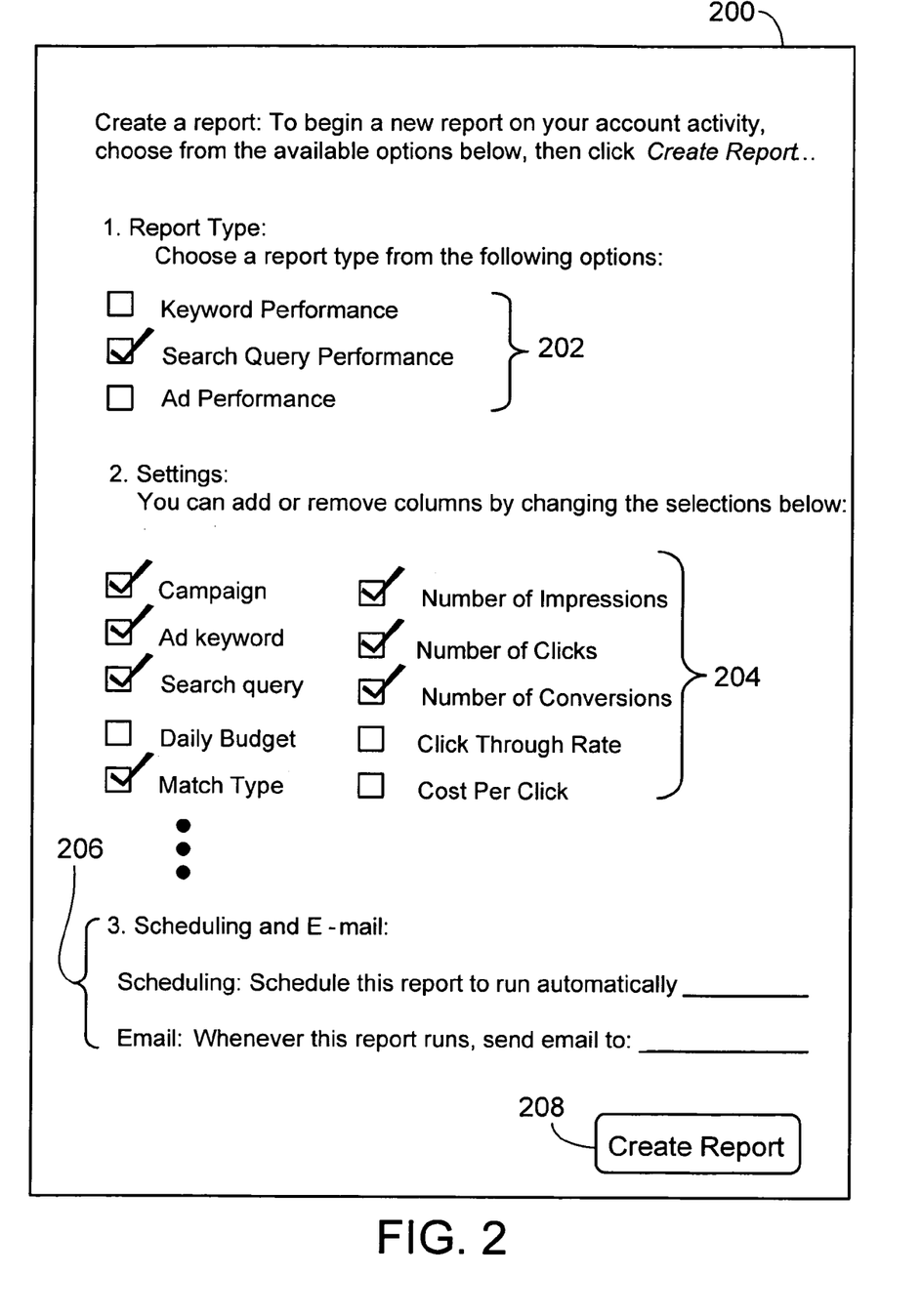
FIG. 2 is a diagram of an example graphical user interface.

FIG. 2 is a diagram of an example of a graphical user interface (GUI) 200 provided by the query statistics engine 114 to allow the advertiser 106 to generate various types of reports and determine what query statistics to view. The GUI 200 may include a portion 202 to allow the advertiser 106 to decide what type of report to generate. In this example, a report for search query performance was selected. The GUI 200 may include a portion 204 to allow the advertiser 106 to determine what information to show in the report. In this example, the items "campaign," "ad keyword," "search query," "match type," "number of impressions," "number of clicks," and "number of conversions" were selected. The GUI 200 may include a portion 206 to allow the advertiser 106 to schedule the report to be generated periodically, and to send an e-mail notice to the advertiser 106 every time a report is generated. The GUI 200 may include additional portions to allow the advertiser 106 to make additional selections. After the advertiser 106 finalizes his selection, he can click on a "create report" button 208 to generate the report.

Figure 3:
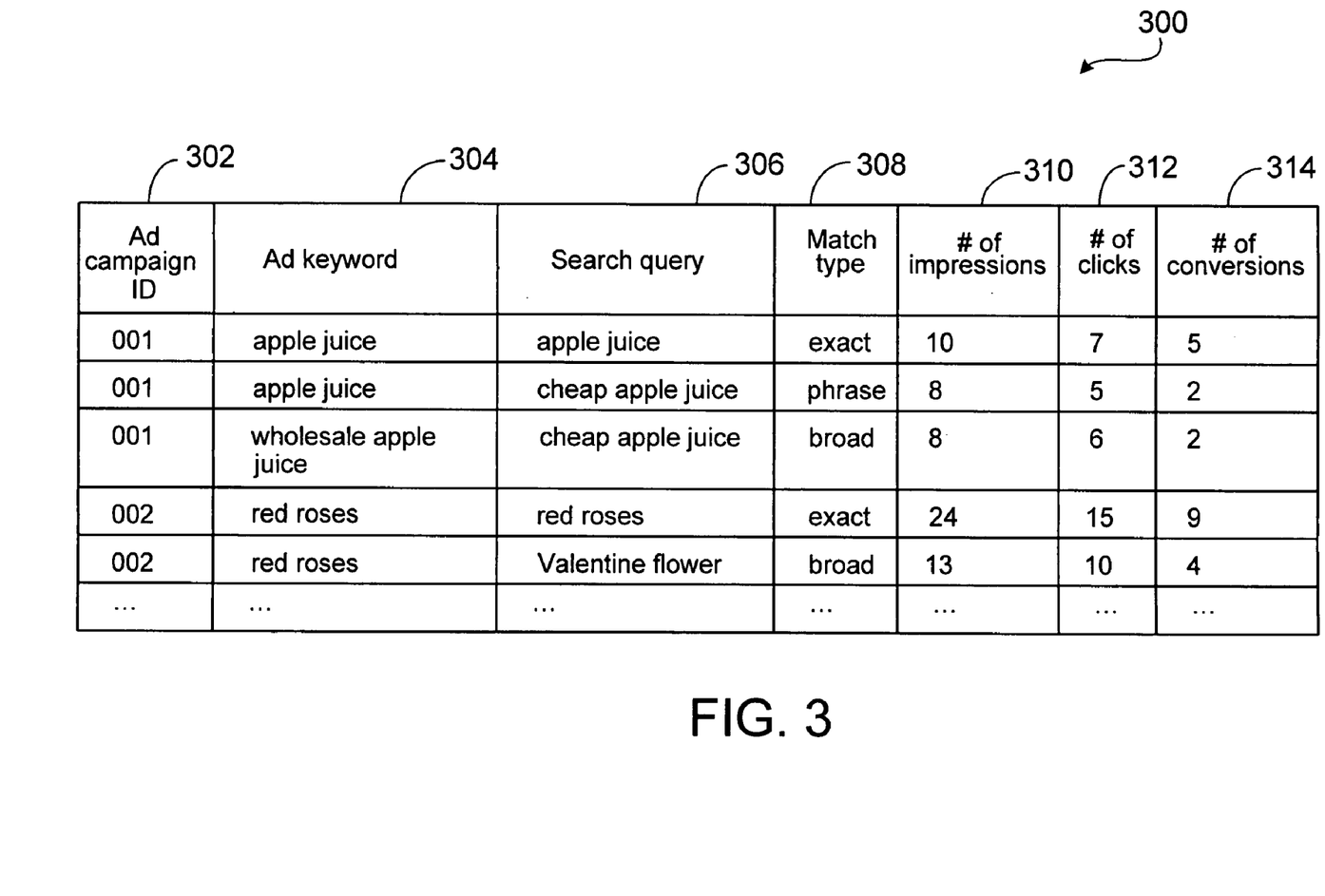
FIG. 3 is an example report of search query statistics.

FIG. 3 is an example of a report 300 of search query statistics that can be provided by the query statistics engine 114 to the advertiser 106. The report 300 can include various columns, for example, campaign number 302, ad keyword 304, search query 306, match type 308, number of impressions 310, number of clicks 312, and number of conversions 314. The columns in the report 300 can be modified based on the advertiser's selections in the GUI 200 of FIG. 2.

Figure 4:
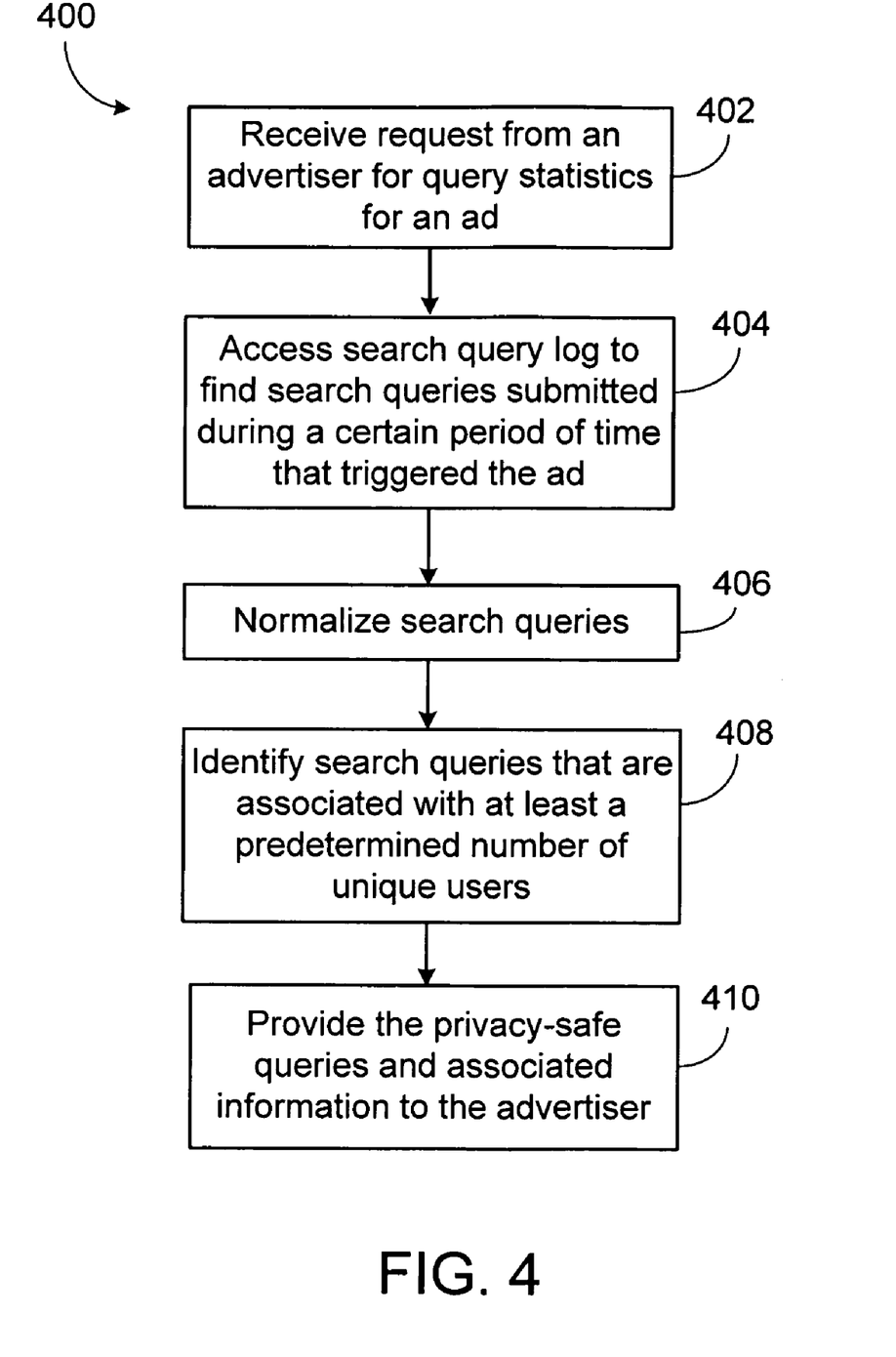
FIG. 4 is a flow diagram of an example process for providing privacy-safe search queries and associated information to advertisers.

FIG. 4 is a flow diagram of an example process 400 for providing privacy-safe search queries and associated information to advertisers 106. The process 400 receives a request from an advertiser for query statistics for an ad (402). The request may specify a certain type of action, such as being displayed, clicked, or converted. For example, the advertiser can be the advertiser 106 of FIG. 1, and the query statistics engine 114 can be used to receive the request from the advertiser 106. The process 400 accesses a search query log to find search queries submitted during a certain period of time that triggered the ad (404). For example, the search query log can be the search query log 112 of FIG. 1, the search queries can be the search queries 116, and the query statistics engine 114 can be used to find the search queries submitted during a certain period of time that triggered the ad.

The process 400 normalizes the search queries (406). For example, the query statistics engine 114 can be used to normalize the search queries. The process 400 identifies search queries that are associated with at least a predetermined number of unique users (408). For example, the query statistics engine 114 can be used to find search queries 116 that each is associated with at least the predetermined number of unique users 104. The query statistics engine 114 can use a proxy method by identifying search queries 116 that each is associated with at least the predetermined number of unique cookie identifiers. The process 400 provides the privacy-safe queries and associated information to the advertiser (410). For example, the query statistics engine 114 can provide the privacy-safe queries 134 and associated information to the advertiser 106.

Figure 5:
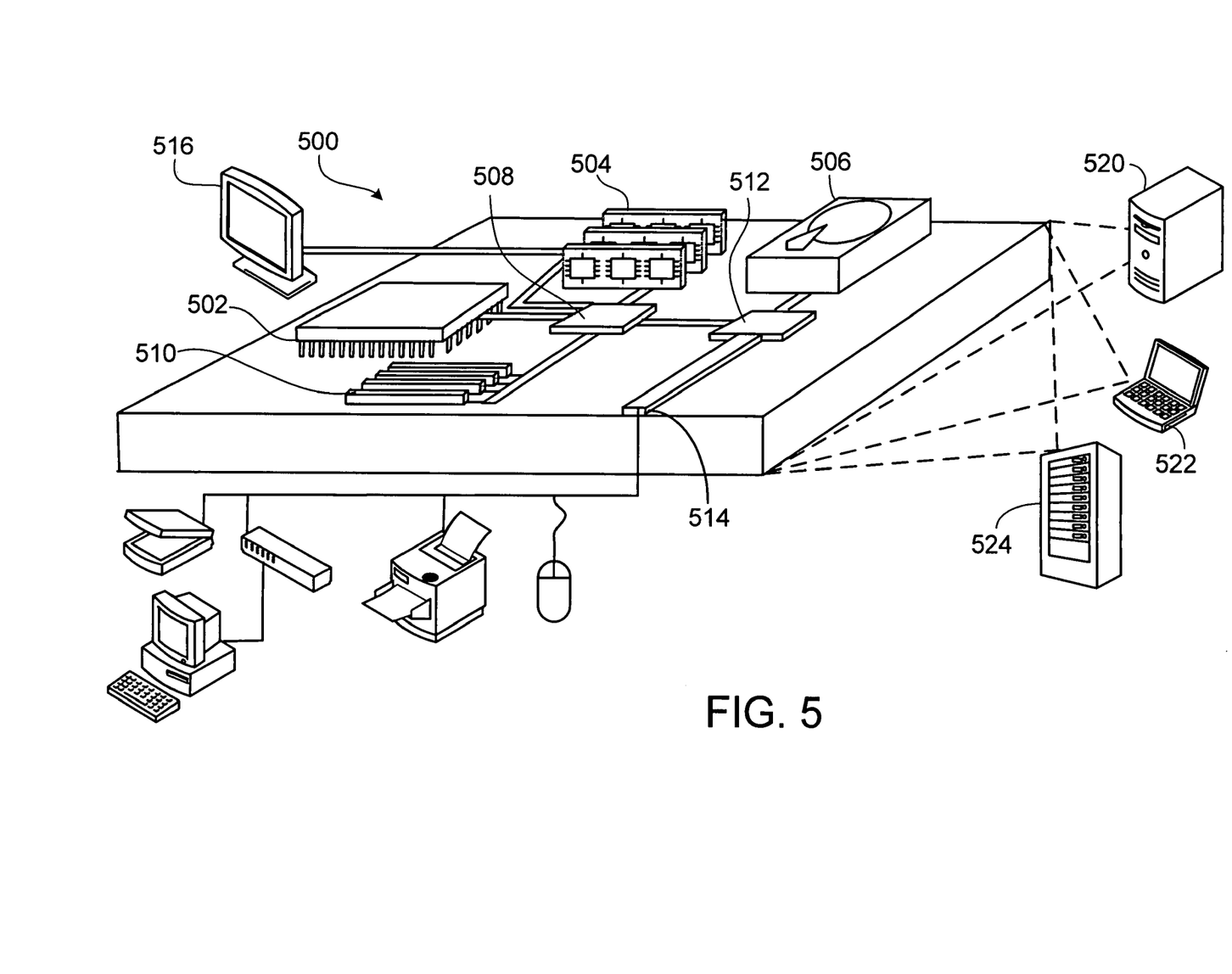
FIG. 5 is a schematic representation of a general computing device.

FIG. 5 is a schematic representation of an example of a general computing device 500 that can be used as, e.g., the search server 108, the ad server 126, or the query statistics engine 114. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, a multi-processor system, a peer-to-peer network, a grid computing infrastructure, or an ad hoc peer-to-peer network).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage, device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, IEEE 1394, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the FIG. For example, it may be implemented as a standard server 520, or multiple times in a group of such servers. It may also be implemented as part of a rack server system 524. In addition, it may be implemented in a personal computer such as a laptop computer 522. Each of such devices (e.g., standard server, rack server system, personal computer, laptop computer) may contain one of more of computing device 500, and an entire system may be made up of multiple computing devices 500 communicating with each other.

In some examples, the client devices 122 can be, e.g., laptops, desktops, workstations, personal digital assistants, mobile phones, or other portable computing devices.

Figure 6:
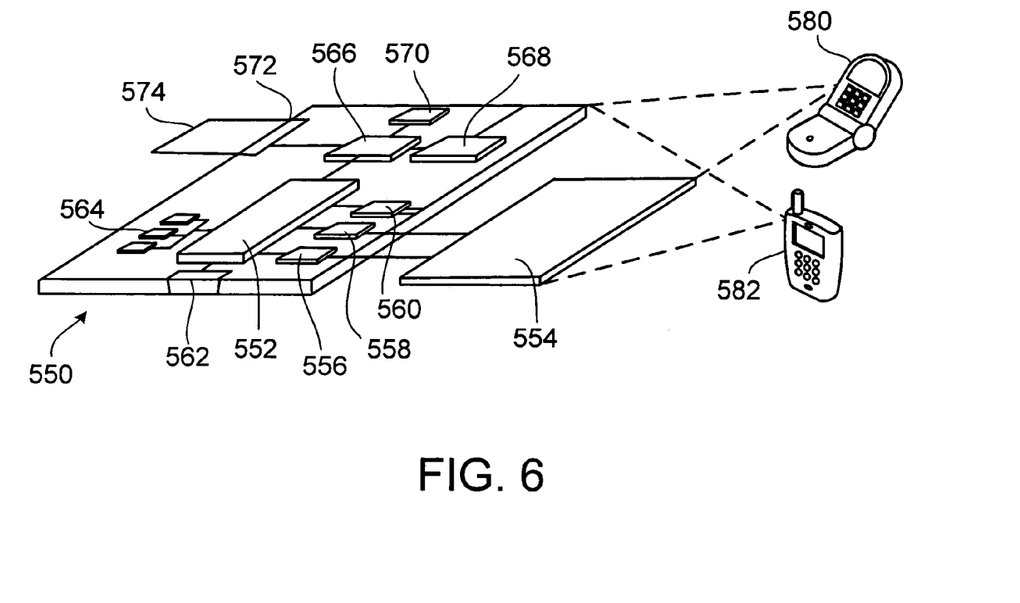
FIG. 6 is a schematic representation of a general portable computing device.

FIG. 6 is a schematic representation of an example of a general portable computing device 550 that includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the FIG. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, such as a CRT (cathode ray tube) or LCD (liquid crystal display) monitor, for displaying information to the user and a keyboard and a pointing device (e.g., a mouse, trackball, touch-sensitive screen, or iDrive-like component) by which the user can provide input to the computer.

Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a backend component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various, modifications may be made without departing from the spirit and scope of the invention. For example, the privacy-safe queries 134 can be classified into categories different from those described above. The search query statistics provided to the advertisers 106 can be different from those described above. Two or more of the search server 108, the ad server, and the query statistics engine 114 can be performed by the same machine, e.g., a server computer. The search queries can include query terms written in different languages. Search queries written in different languages may be considered to be different search queries, even if they have the same meaning. Normalization of the search queries can be performed differently than those described above.

Artificial intelligence or pattern matching methods may be used to augment the processes for identifying privacy-safe queries. For example, after the query statistics engine 114 identifies privacy-safe search queries 134 by identifying search queries 116 associated with at least a predetermined number of unique identifiers submitted over a predetermined period of time, the query statistics engine 114 may use artificial intelligence or pattern matching methods to examine the privacy-safe queries 134 to see if they include patterns that are similar to certain types of personal information. For example, the query statistics engine 114 may examine the search queries 134 to determine whether they include patterns of the type "xxx-xx-xxxx," which may be a social security number, or patterns that are similar to credit card numbers or bank account numbers. The query statistics engine 114 may exclude; search queries that include such questionable patterns from the privacy-safe query log 118.

For example, the at least predetermined number of unique identifiers may correspond to, in some implementations, at least ten, fifty, of one hundred unique users. Other predetermined numbers may also be used. A predetermined period of time may be one hour, one day, one week or another period of time based on, for example, the time needed to meet the throughput of matching queries with a unique identifier meeting the predetermined number of users. The predetermined values described herein can thus be adjusted based on the throughput of queries and sensitivity level desired by an advertising sponsor or the advertising network as a whole.

Various forms of the flows shown above may be used, with steps re-ordered, added, or removed. Also, although several applications and methods have been described, it should be recognized that numerous other applications are contemplated. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The details of one or more embodiments of the invention are set forth in the accompanying drawings and the description below. Other features, objects, and advantages of the invention will be apparent from the description and drawings, and from the claims.

What is claimed is:

1. A computer-implemented method of determining privacy-safe queries for providing to an advertiser, the method comprising:
   receiving a request from the advertiser for query statistics for an ad provided by the advertiser;
   identifying a first set of search queries from a search query log that includes search queries submitted to a search service over a predetermined length of time, wherein the search query log indicates that each query in the first set of search queries triggered at least one display of the ad that resulted in a user clicking on the ad;
   identifying a second set of search queries from the first set of search queries, the identifying including selecting search queries from the first set of search queries and for each selected search query:
      determining a number of unique identifiers associated with the selected search query, each unique identifier being associated with a unique client device that submitted a search request containing the search query;
      in response to determining that the number of unique identifiers exceeds a predetermined number of unique identifiers, including the selected search query in the second set of search queries, wherein the predetermined number of unique identifiers has a value greater than one and results in each search query included in the second set of search queries being specified as privacy-safe, and wherein each search query included in the second set of search queries does not include personal information; and
   providing the second set of search queries and query statistics for each query in the second set of search queries to the advertiser in response to the request.

2. The method of claim 1 wherein the unique identifier comprises a cookie identifier.

3. The method of claim 1, further comprising categorizing the second set of search queries into two or more categories based on a level of similarity between each of the search queries and a keyword associated with the ad.

4. The method of claim 3, further comprising providing the two or more categories of search queries to the advertiser.

5. The method of claim 1, further comprising normalizing the search queries.

6. The method of claim 5 wherein normalizing the search queries comprises identifying query terms in the search queries and preserving an ordering of the query terms.

7. A computer-implemented method of determining privacy-safe queries for providing to an advertiser, the method comprising:

receiving a request from the advertiser for query statistics for an ad provided by the advertiser;

identifying one or more first search queries from a search query log that includes search queries submitted to a search service over a predetermined length of time, wherein the search query log indicates that each of the first search queries triggered at least one display of the ad that resulted in a user clicking on the ad;

identifying one or more second search queries from the first search queries that have low probability of including personal information of a user who submitted the search query, the identifying including selecting search queries from the first search queries and for each selected search query:

determining a number of unique identifiers associated with the selected search query, each unique identifier being associated with a unique client device that submitted a search request containing the search query;

in response to determining that the number of unique identifiers exceeds a predetermined number of unique identifiers, including the selected search query with the second search queries, wherein the predetermined number of unique identifiers has a value greater than one and results in each search query included in the second search queries being specified as privacy-safe, and wherein each search query included in the second search queries does not include personal information; and providing the second search queries and query statistics for each second search query to the advertiser in response to the request.

8. The method of claim 7 wherein each unique identifier comprises a unique cookie identifier.

9. The method of claim 7, further comprising categorizing the set of search queries into two or more categories based on a level of similarity between each of the search queries and a keyword or key phrase associated with the advertisement.

10. An apparatus for determining privacy-safe queries for providing to an advertiser, the apparatus comprising:

a query statistics engine to automatically identify first and second sets of search queries that have a low probability of including personal data of users who submitted the search queries, in which the query statistics engine identifies the first set of search queries from a search query log that includes search queries submitted to a search service over a predetermined length of time, and where the query statistics engine determines that the search query log indicates that each query in the first set of search queries triggered at least one display of an ad that resulted in a user clicking on the ad, and where the query statistics engine selects search queries from the first set of search queries and for each selected search query:

determines a number of unique identifiers associated with the selected search query, each unique identifier being associated with a unique client device that submitted a search request containing the search query;

in response to determining that the number of unique identifiers exceeds a predetermined number of unique identifiers, includes the selected search query in the second set of search queries, wherein the predetermined number of unique identifiers has a value greater than one and results in each search query included in the second set of search queries being specified as privacy-safe, and wherein each search query included in the second set of search queries does not include personal information; and a data storage device to store the second set of search queries in association with the ad.

11. The apparatus of claim 10, further comprising a search server to receive search requests containing search queries, and store the search queries in the data storage device.

12. The apparatus of claim 10 wherein the unique identifier comprises a cookie identifier.

13. The apparatus of claim 10 wherein the query statistics engine normalizes the search queries.

14. The apparatus of claim 13 wherein the query statistics engine normalizes the search queries by identifying query terms in the search queries and preserving an ordering of the query terms.

15. A computer-implemented method of determining privacy-safe queries for providing to an advertiser, the method comprising:

receiving a request for search query information based on at least one query keyword associated with an advertisement;

identifying a first set of search queries from a search query log associated with the at least one query keyword, the set of search queries including search queries submitted to a search service over a predetermined length of time, wherein the search query log indicates that each query in the first set of search queries triggered at least one display of the advertisement that resulted in a user clicking on the advertisement;

identifying a second set of search queries from the first set of search queries, the identifying including selecting search queries from the first set of search queries and for each selected search query:

determining a number of unique identifiers associated with the selected search query, each unique identifier being associated with a unique client device that submitted a search request containing the search query;

in response to determining that the number of unique identifiers exceeds a predetermined number of unique identifiers, including the selected search query in the second set of search queries, wherein the predetermined number of unique identifiers has a value greater than one and results in each search query included in the second set of search queries being specified as privacy-safe, and wherein each search query included in the second set of search queries does not include personal information; and associating the set of search queries with the advertisement and the at least one query keyword.

16. The method of claim 15 wherein the association between the search queries from the search query log and the at least one query keyword comprises an exact match.

17. The method of claim 15 wherein the association between the search queries from the search query log and the at least one query keyword comprises an expanded match.

18. The method of claim 15 wherein the association between the search queries from the search query log and the at least one query keyword comprises a broad match.

19. The method of claim 15 wherein the association between the search queries from the search query log and the at least one query keyword comprises a combination of at least two of exact matches, expanded matches or broad matches.

20. The method of claim 19, further comprising categorizing the set of search queries into two or more categories based on a level of similarity between each of the search queries and the query keyword.

21. The method of claim 20, further comprising providing the two or more categories of search queries to the advertiser.

22. The method of claim 15 wherein the unique identifier comprises a cookie identifier.

23. An apparatus comprising:

a data storage device;

a search server to receive search requests containing search queries, and store the search queries in the data storage device;

an advertising server to receive advertisements from advertising sponsors for advertisement placement;

a query statistics engine to automatically identify first and second sets of search queries from the search server that have a low probability of including personal data of users who submitted the search queries, in which the query statistics engine identifies the first set of search queries from a search query log that includes search queries submitted to the search server over a predetermined length of time, and where the query statistics engine determines that the search query log indicates that each query in the first set of search queries triggered at least one display of a first advertisement from a first advertising sponsor that resulted in a user clicking on the first advertisement, and where the query statistics engine selects search queries from the first set of search queries and for each selected search query:

determines a number of unique identifiers associated with the selected search query, each unique identifier being associated with a unique client device that submitted a search request containing the search query;

in response to determining that the number of unique identifiers exceeds a predetermined number of unique identifiers, includes the selected search query in the second set of search queries, wherein the predetermined number of unique identifiers has a value greater than one and results in each search query included in the second set of search queries being specified as privacy-safe; and a matching engine that matches the second set of search queries to the first advertisement from the first advertising sponsor.

24. The apparatus of claim 23, wherein the matching engine includes at least one of an exact match engine, an expanded match engine, and a broad match engine.

25. The apparatus of claim 23 wherein the unique identifier comprises a cookie identifier.

26. The apparatus of claim 23 wherein the query statistics engine normalizes the search queries.

27. The apparatus of claim 26 wherein the query statistics engine normalizes the search queries by identifying query terms in the search queries and preserving an ordering of the query terms.

* * * * *